(12) United States Patent
Kubota

(10) Patent No.: US 9,125,080 B2
(45) Date of Patent: Sep. 1, 2015

(54) RADIO BASE STATION, CONTROL PROCESSOR, PROGRAM AND RADIO RESOURCE ALLOCATION CONTROL METHOD

(75) Inventor: Mitsuhiro Kubota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 64 days.

(21) Appl. No.: 13/577,564

(22) PCT Filed: Jan. 20, 2011

(86) PCT No.: PCT/JP2011/051535
§ 371 (c)(1),
(2), (4) Date: Aug. 7, 2012

(87) PCT Pub. No.: WO2011/096315
PCT Pub. Date: Aug. 11, 2011

(65) Prior Publication Data
US 2012/0307770 A1    Dec. 6, 2012

(30) Foreign Application Priority Data

Feb. 8, 2010   (JP) ................. 2010-025447

(51) Int. Cl.
*H04W 72/04* (2009.01)
*H04W 28/02* (2009.01)
*H04W 28/10* (2009.01)

(52) U.S. Cl.
CPC ...... *H04W 28/0205* (2013.01); *H04W 28/0268* (2013.01); *H04W 28/10* (2013.01); *H04W 72/0486* (2013.01)

(58) Field of Classification Search
CPC ............. H04B 7/15542; H04W 16/26; H04W 84/047; H04W 4/26; H04W 36/0033; H04W 36/30; H04W 72/04; H04W 28/24; H04W 28/0268; H04W 28/0205; H04W 72/08; H04W 84/04; H04W 72/0406; H04W 72/0486; H04W 28/18; H04W 48/20; H04W 74/08; H04W 72/0426; H04W 88/08; H04W 92/045; H04W 28/10; H04W 36/22; H04W 72/0446; H04W 72/10; H04W 28/06; H04W 36/0083; H04W 72/0413; H04W 72/0453; H04W 72/048; H04W 72/1289; H04W 76/02; H04W 92/12; H04W 24/00; H04W 28/0231; H04W 28/08; H04W 28/20; H04W 28/22; H04W 72/082; H04W 72/12; H04W 72/1273; H04W 36/0061; H04W 36/08; H04W 36/18; H04W 36/26; H04W 36/36; H04W 52/0206; H04W 52/143; H04W 52/20; H04W 52/265; H04W 52/267; H04W 52/343; H04W 52/386; H04W 52/48; H04W 72/0493; H04W 72/1268; H04W 74/00; H04W 74/06; H04W 84/045; H04W 84/12; H04W 88/02; H04W 88/06; H04W 88/12; H04W 88/16; H04W 82/14; H04W 72/1284; H04W 72/14; H04W 88/04; H04W 88/085; H04W 92/20; H04W 12/10; H04W 16/06; H04W 16/32; H04W 28/04; H04W 28/12; H04W 28/26; H04L 47/2475; H04L 12/56; H04L 5/0053; H04L 5/0007; H04L 27/2602; H04L 47/10; H04L 47/14; H04L 47/824; H04L 12/5695; H04L 2001/0097; H04L 47/12; H04L 47/822; H04L 5/003; H04L 5/0064; H04L 5/0085; H04L 5/0087; H04L 5/0091; H04L 1/1819; H04L 1/1854; H04L 1/1861; H04L 1/1887; H04L 41/5003; H04L 41/5025; H04L 41/509; H04L 41/5096; H04L 47/11; H04L 47/15; H04L 47/24; H04L 47/2416; H04L 47/263; H04L 47/32; H04L 47/745; H04L 47/746; H04L 47/76; H04L 47/762; H04L 47/781; H04L 47/801; H04L 47/805; H04Q 7/20
USPC ......... 370/329, 230, 216, 315, 238, 331, 229, 370/328, 431, 468, 235, 236, 252, 211, 246, 370/280, 293, 310, 332, 335, 336, 338, 343, 370/350, 352, 395.2, 395.21, 464, 230.1, 370/231, 241, 278, 333, 353, 389, 449; 455/406, 436, 453, 410, 519, 418, 455/422.1, 445, 450, 452.2, 452.1, 509, 455/437, 443, 442, 67.13, 9, 11.1, 16, 438, 455/449, 464, 510, 561, 69, 7, 13.4, 405, 455/426.1, 432.1, 439, 444, 511, 522, 525, 455/63.1

See application file for complete search history.

(56) References Cited

U.S. PATENT DOCUMENTS

| | | | |
|---|---|---|---|
| 5,740,537 A | 4/1998 | Beming et al. | |
| 2005/0107107 A1 | 5/2005 | Shahidi et al. | |
| 2008/0130495 A1 | 6/2008 | Dos Remedios et al. | |
| 2008/0248807 A1* | 10/2008 | Kim et al. | 455/453 |
| 2009/0067335 A1* | 3/2009 | Pelletier et al. | 370/238 |
| 2010/0159976 A1* | 6/2010 | Marocchi et al. | 455/519 |
| 2011/0194535 A1* | 8/2011 | Johansson et al. | 370/331 |
| 2012/0063417 A1* | 3/2012 | Redana et al. | 370/331 |
| 2013/0053048 A1* | 2/2013 | Garcia et al. | 455/450 |

FOREIGN PATENT DOCUMENTS

| | | | | |
|---|---|---|---|---|
| CN | 1214845 A | | 4/1999 | |
| GB | 2454872 A | * | 5/2009 | H04W 36/22 |
| JP | 2000-504171 A | | 4/2000 | |
| JP | 2002-300643 A | | 10/2002 | |
| JP | 2005-039650 A | | 2/2005 | |
| JP | 2006-197605 A | | 7/2006 | |
| JP | 2007-511979 A | | 5/2007 | |
| JP | 2007-336488 A | | 12/2007 | |
| JP | 2009-111498 A | | 5/2009 | |

OTHER PUBLICATIONS

International Search Report for PCT/JP2011/051535 dated Feb. 22, 2011.

Communication dated Aug. 1, 2014, from the State Intellectual Property Office of the People's Republic of China in counterpart Chinese Application No. 201180008796.X.

* cited by examiner

*Primary Examiner* — Charles C Jiang
*Assistant Examiner* — Rose Clark
(74) *Attorney, Agent, or Firm* — Sughrue Mion, PLLC

(57) ABSTRACT

A radio base station according to this invention includes: a radio resource allocation determination unit for determining whether or not to allocate a radio resource to a mobile communication device; a radio resource control unit for allocating the radio resource to the mobile communication device to which the radio resource allocation determination unit has determined to carry out the allocation of the radio resource; and a backhaul line control unit for providing control of outputting data received from the mobile communication device to a backhaul line for relaying the data to a higher-level network. When congestion occurs, the radio resource control unit reduces an amount of the radio resource to be allocated, and the radio resource allocation determination unit determines whether or not to allocate the radio resource to another mobile communication device, depending on whether or not the received data satisfies predetermined service quality.

13 Claims, 7 Drawing Sheets

| PRIORITY | NUMBER OF BEARERS |
|---|---|
| QCI1 | 0 |
| QCI2 | 0 |
| QCI3 | 0 |
| QCI4 | 1 |
| QCI5 | 3 |
| QCI6 | 7 |
| : | : |

FIG. 3

RADIO BASE STATION, CONTROL PROCESSOR, PROGRAM AND RADIO RESOURCE ALLOCATION CONTROL METHOD

CROSS REFERENCE TO RELATED APPLICATIONS

This application is a National Stage of International Application No. PCT/JP2011/051535 filed Jan. 20, 2011, claiming priority based on Japanese Patent Application No. 2010-025447 filed Feb. 8, 2010, the contents of all of which are incorporated herein by reference in their entirety.

TECHNICAL FIELD

This invention relates to a radio base station, a control processor, a program, and a radio resource allocation control method, and more particularly, to a radio base station, a control processor, a program, and a radio resource allocation control method, which are for use when congestion occurs on a backhaul line.

BACKGROUND ART

The communication speed increases in the Long Term Evolution (LTE), which is a next generation mobile communication, compared with the third generation mobile communication. The increase in communication speed is realized by an increased radio bandwidth, which is used between a mobile communication device and a radio base station. It is thus necessary to increase a line speed or a line capacity of a backhaul line connecting a higher-level network, which includes the mobility management element (MME) and the serving gate way (S-GW), with the radio base station. However, an amount of data transmitted from the mobile communication device to the radio base station may exceed an amount of data which can be transmitted on the backhaul line depending on a quality of a network or the backhaul line built based on a network design of a telecommunications carrier. In this case, the radio base station carries out flow control to limit the amount of data transmitted to the backhaul line.

Japanese Unexamined Patent Application Publication (JP-A) No. 2006-197605 (hereinafter, referred to as Patent Literature 1) describes a technology for efficiently transmitting a control traffic and a bearer traffic on a backhaul line. In general, a resource on the backhaul line is sufficiently allocated to the control traffic requiring a high reliability. Therefore, a bandwidth available for transmitting the bearer traffic is reduced. To address this problem, Patent Literature 1 discloses a communication method involving monitoring the control traffic transmitted on the backhaul line, and allocating a proper amount of the resource to the control traffic transmitted on the backhaul line.

Japanese Unexamined Patent Application Publication (JP-A) No. 2007-336488 (hereinafter, referred to as Patent Literature 2) discloses a method involving allocating a resource to be allocated to channel quality information transmitted from a mobile station to a base station. If an amount of data to be transmitted from the mobile station to the base station is large, the resource to be allocated to the channel quality information is reduced. Moreover, if the amount of data to be transmitted from the mobile station to the base station is small, the resource to be allocated to the channel quality information is increased. As a result, if the amount of data other than control information is large, the resource allocated to the channel quality information corresponding to the control information can be reduced, and hence a large amount of data can be transmitted.

Japanese Unexamined Patent Application Publication (JP-A) No. 2009-111498 (hereinafter, referred to as Patent Literature 3) discloses a control method of receiving a new call from a radio terminal in a radio base station. If a throughput of an existing call, to which a priority lower than a priority set to a new call is set, is lower than a threshold, the radio base station rejects a reception of the new call. As a result, it is possible to prevent a decrease in throughput of an existing call of low priority.

DISCLOSURE OF THE INVENTION

Problem to be Solved by the Invention

According to the communication methods described in Patent Literatures 1 and 2, the radio base station cannot adjust the amount of data received from the mobile station, such as audio data and video data. Therefore, if the radio base station receives data exceeding an amount which can be transmitted to the backhaul line, the flow control is carried out in the radio base station, and the amount of data to be transmitted to the backhaul line is restrained. However, the radio base station cannot transmit all the received data to the back haul line. Therefore, there arises a problem in that data dwells in the radio base station. Moreover, according to Patent Literature 3, if the throughput of the existing call is equal to or higher than the threshold, a new call is received. As a result, if congestion is occurring on the backhaul line, there arises a problem in that more data dwells in the radio base station. However, if a reception of a new call is rejected when congestion is occurring on the backhaul line in order to avoid the problem of more data dwell caused by receiving a new call, there arises a problem in that a lost call rate increases.

This invention has been made in view of above-mentioned problems, and therefore has an object to provide a radio base station, a control processor, a program, and a radio resource allocation method capable of preventing data from dwelling, which occurs in the radio base station by the congested state of the backhaul line, and of preventing the lost call rate from increasing.

Means to solve the Problems

According to a first aspect of this invention, there is provided a radio base station, including: a radio resource allocation determination unit for determining whether or not to allocate a radio resource to a first mobile communication device; a radio resource control unit for allocating the radio resource to the first mobile communication device to which the radio resource allocation determination unit has determined to carry out the allocation of the radio resource; and a backhaul line control unit for providing control of outputting data received from the first mobile communication device to a backhaul line for relaying the data to a higher-level network, in which, when congestion occurs on the backhaul line: the radio resource control unit reduces an amount of the radio resource to be allocated to the first mobile communication device compared with an amount of the radio resource allocated before the occurrence of the congestion; and the radio resource allocation determination unit determines whether or not to allocate the radio resource to a second mobile communication device to which the radio resource is to be newly allocated after the occurrence of the congestion on the backhaul line, depending on whether or not the data received from the first mobile communication device satisfies a predetermined service quality.

According to a second aspect of this invention, there is provided a control processor for determining, when congestion occurs on a backhaul line, to which a base station outputs data transmitted from a mobile communication device to the base station for relaying the data to a higher-level network, whether or not to allocate a radio resource to another mobile communication device to which the radio resource is to be newly allocated after the occurrence of the congestion on the backhaul line, depending on whether or not the data received by the radio base station satisfies predetermined service quality.

According to a third aspect of this invention, there is provided a program for causing a computer to execute a step of determining, when congestion occurs on a backhaul line, to which a base station outputs data transmitted from a mobile communication device to the base station for relaying the data to a higher-level network, whether or not to allocate a radio resource to another mobile communication device to which the radio resource is to be newly allocated after the occurrence of the congestion on the backhaul line, depending on whether or not the data received by the radio base station satisfies predetermined service quality.

According to a fourth aspect of this invention, there is provided a radio resource allocation control method, including the steps of: detecting congestion on a backhaul line when data transmitted from a mobile communication device is output to the backhaul line for relaying the data to a higher-level network; reducing an amount of a radio resource to be allocated to the mobile communication device when the congestion occurs on the backhaul line; and determining whether or not to allocate the radio resource to another mobile communication device to which the radio resource is to be newly allocated after the congestion occurs on the backhaul line, depending on whether or not the data transmitted from the mobile communication device satisfies predetermined service quality.

Effect of the Invention

According to this invention, the radio base station, the control processor, the program, and the radio resource allocation method capable of preventing data from dwelling, which occurs in the radio base station by the congested state of the backhaul line, and of preventing the lost call rate from increasing can be provided.

BRIEF DESCRIPTION OF DRAWING

FIG. 3 is a data table in which a QCI and the number of bearers which do not satisfy service quality and associated with each other according to the first embodiment.

BEST MODE FOR EMBODYING THE INVENTION

First Embodiment

Figure 1:
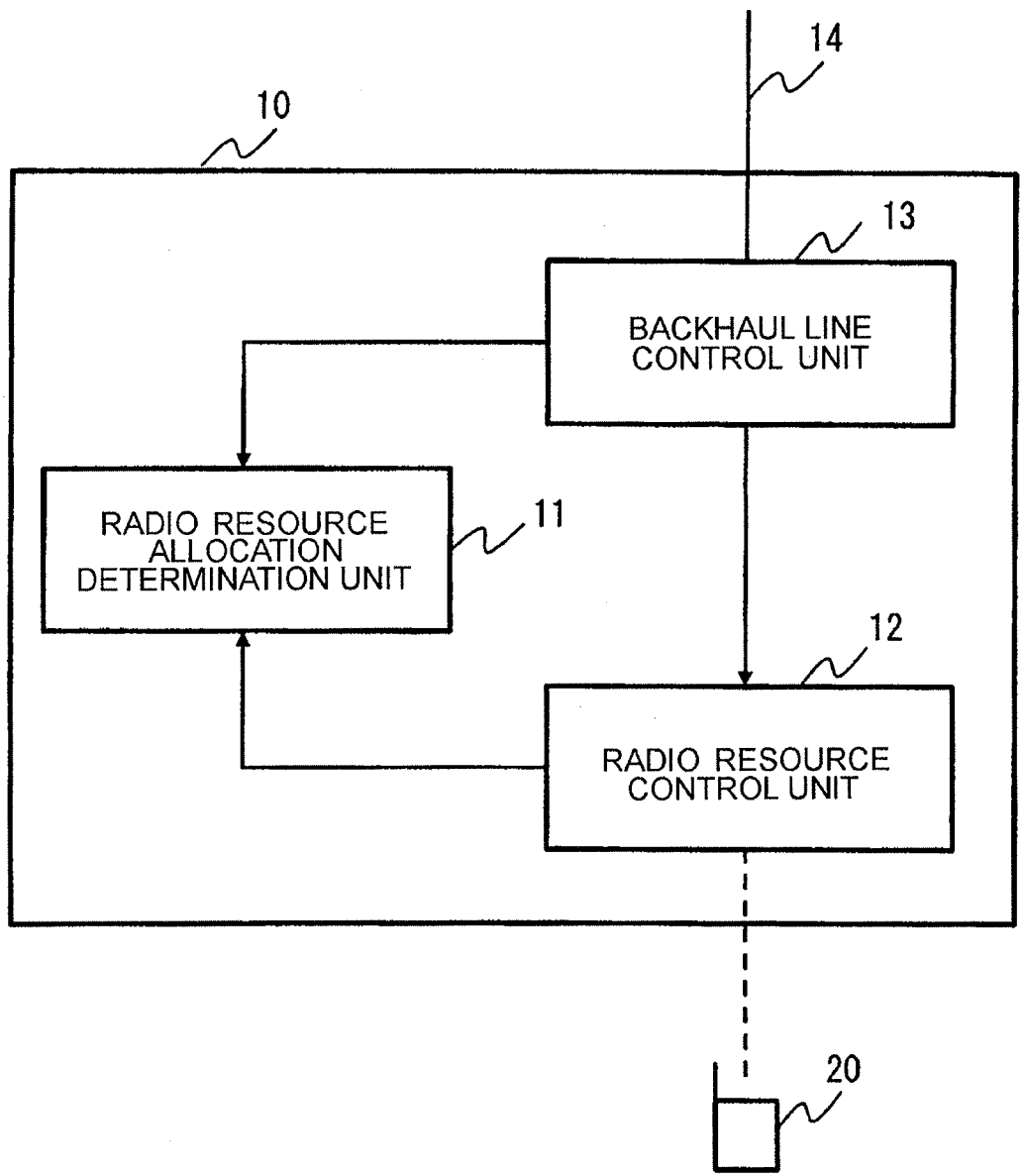
FIG. 1 is a configuration diagram of a radio base station according to a first embodiment.

A description is now given of an embodiment of this invention referring to the drawings. A description is given of a configuration example of a radio base station according to a first embodiment referring to FIG. 1. The radio base station 10 includes a radio resource allocation determination unit 11, a radio resource control unit 12, and a backhaul line control unit 13. The backhaul line control unit 13 is connected to a backhaul line 14 for relaying data received from a mobile communication device to a higher-level network. Moreover, the radio base station 10 communicates to/from a mobile communication device 20 by using a radio communication line. In the radio base station 10, the higher-level network includes the MME for carrying out mobility control and the S-GW for processing audio data, video data, and the like. The mobile communication device 20 includes a mobile telephone terminal or a personal digital assistant (PDA) terminal.

The radio resource allocation determination unit 11 determines whether or not to allocate a radio resource to the mobile communication device 20. For example, when the mobile communication device 20 requests an allocation of the radio resource, the radio resource allocation determination unit 11 determines whether or not to allocate the radio resource to the mobile communication device 20 based on a state of the radio resource allocated to other mobile communication devices.

A description is now given of preprocessing before the mobile communication device 20 makes the radio resource allocation request. The mobile communication device 20 receives the broadcast channel (BCH) when is turned on, or when the mobile communication device 20 moves from an area covered by another radio base station to an area covered by the radio base station 10, or the like, and acquires information, such as a bandwidth of a system, required for communication between the radio base station 10 and the mobile communication device 20. The mobile communication device 20 transmits a random access channel (RACH) to the radio base station 10 after receiving the BCH, thereby establishing synchronization between the radio base station 10 and the mobile communication device 20. As a result of the establishment of the synchronization between the radio base station 10 and the mobile communication device 20, the mobile communication device 20 can transmit data at a timing scheduled by the radio base station 10.

The mobile communication device 20 requests the radio base station 10 to allocate the radio resource when data to be transmitted is generated in the state in which the mobile communication device 20 is synchronized with the radio base station 10. For example, the mobile communication device 20 requests the allocation of the radio resource when the mobile communication device 20 starts a voice call or transmission of packet data. The reception of the allocation request of the radio resource by the radio resource allocation determination unit 11 has the same meaning as a reception of a call.

The radio base station 10 has established the synchronization with a plurality of mobile communication devices, and has allocated the radio resource to these mobile communication devices. Therefore, in a case where the mobile communication device 20 requests an allocation of the radio resource, the radio base station 10 allocates the radio resource to the mobile communication device 20 when an amount of the radio resource allocated to the other mobile communication devices is less than a predetermined amount. When the amount of the radio resource allocated to the other mobile communication devices exceeds the predetermined amount, the radio base station 10 does not allocate the radio resource to the mobile communication device 20. A state in which communication cannot be carried out due to unavailability of allocation of the radio resource is referred to as lost call.

The radio resource control unit 12 allocates the radio resource when the allocation of the radio resource to the mobile communication device 20 is determined in the radio resource allocation determination unit 11. The radio resource is allocated to data (hereinafter, referred to as uplink data) transmitted from the mobile communication device 20 to the radio base station 10. The radio resource to be allocated is a resource block (RB) containing time information representing a timing of the transmission, and frequency information representing a frequency used for the transmission. The radio resource control unit 12 outputs information on the radio resource allocated to each of the mobile communication devices to the radio resource allocation determination unit 11. The radio resource information is information identifying an allocated RB. Moreover, the radio resource information may contain information on the number of allocated RBs.

The backhaul line control unit 13 provides control of outputting data received from the mobile communication device 20 to the backhaul line 14. For example, when congestion occurs on the backhaul line 14, the backhaul line control unit 13 carries out the flow control, thereby adjusting the amount of data output to the backhaul line 14. Moreover, when congestion occurs on the backhaul line 14, the backhaul line control unit 13 notifies the radio resource allocation determination unit 11 of the occurrence of congestion. Further, the backhaul control unit 13 notifies the radio resource control unit 12 of a radio resource allocation restriction.

A description is now given of an operation of the backhaul line control unit 13 when congestion occurs on the backhaul line 14. When the radio resource allocation restriction is notified, the radio resource control unit 12 reduces an amount of the radio resource allocated to a plurality of mobile communication devices. As a result, the amount of data received from the plurality of mobile communication devices can be reduced, and hence data dwell in the radio base station 10 caused by the congestion on the backhaul line 14 can be resolved.

Moreover, when the radio resource allocation restriction is notified, the radio resource control unit 12 may notify the mobile communication devices synchronized with the radio base station 10 of the state that the radio resource allocation restriction is notified. The mobile communication devices which receive the notification reduce the amount of data to be transmitted, and hence the amount of data received by the radio base station 10 as well as the allocated amount of the radio resource can be reduced.

When the occurrence of congestion on the backhaul line 14 is notified, the radio resource allocation determination unit 11 determines, depending on whether or not data received from the mobile communication devices satisfy predetermined service quality, whether or not to allocate the radio resource to a mobile communication device to which the radio resource is to be newly allocated after the notification of the occurrence of congestion. The service quality is specified for each communication line (bearer) set between each of the mobile communication device and the radio base station 10. A plurality of bearers may be set to one mobile communication device. The specified service quality varies for each QCI (service class). Each QCI has a priority. The service quality is a bit rate or a delay of data received from the mobile communication device, for example. The delay of data received from the mobile communication device represents a period from generation of data in the mobile communication device to reception of the data by the radio base station 10.

On this occasion, a description is given of a reason that the radio resource allocation determination unit 11 uses at least one of the bit rate and the delay to determine whether or not to allocate the radio resource. When congestion occurs on the backhaul line 14, the radio resource control unit 12 restricts the allocation of the radio resource. As a result, the amount of data which the mobile communication device can transmit decreases. Consequently, the bit rate of the data transmitted from the mobile communication device to the radio base station 10 decreases. Moreover, data to be transmitted dwells in the mobile communication device as a result of the restriction of the radio resource by the radio resource control unit 12. Consequently, a delay occurs in the data transmitted from the mobile communication device to the radio base station 10. Therefore, the bit rate and the delay of data are parameters which may fluctuate when congestion occurs on the backhaul line 14. Therefore, it is possible to determine, by using these parameters, whether or not to allocate the radio resource in consideration of a state after congestion occurs on the backhaul line 14.

For each QCI, the radio resource allocation determination unit 11 acquires, from the radio resource control unit 12, information with which the number of bearers which do not satisfy a predetermined service quality is associated. Alternatively, for each QCI, the radio resource allocation determination unit 11 may acquire, from the radio resource control unit 12, information with which the number of mobile communication devices which do not satisfy predetermined service quality is associated. After occurrence of congestion is notified, when allocation of the radio resource is requested, the radio resource allocation determination unit 11 checks whether or not the service quality is satisfied on each of bearers to which a QCI having a priority equal to or higher than a priority of a QCI requested by a mobile communication device is set. When the number of bearers which do not satisfy the service quality is equal to or less than, or less than a threshold A, the radio resource allocation determination unit 11 permits the allocation of the radio resource to the mobile communication device which has requested the allocation of the radio resource. When the number of bearers which do not satisfy the service quality is equal to or more than, or more than the threshold A, the radio resource allocation determination unit 11 rejects the allocation of the radio resource to the mobile communication device. As a result, when certain service quality is satisfied in the radio base station 10, the radio resource can be allocated, and an increase in the lost call rate can thus be restrained.

A description is now given of congestion detection control on the backhaul line 14 in the backhaul line control unit 13. The backhaul line control unit 13 is provided with a buffer for outputting data to the backhaul line 14 for each of the QCIs. The backhaul line control unit 13 determines that the backhaul line 14 is congested, when a total amount of data accumulated in the respective buffers exceeds a threshold B. Alternatively, when the amount of data accumulated in a buffer corresponding to any one of the QCIs exceeds a threshold C, the backhaul control unit 13 may determine that the backhaul line 14 is congested. Moreover, the backhaul line control unit 13 may detect congestion on the backhaul line 14 by receiving a notification of the congestion from a device (not shown) monitoring congestion on the backhaul line 14.

On this occasion, the backhaul line control unit 13 determines that the congestion is resolved when the total amount of the data accumulated on the respective buffers falls below a threshold D. Alternatively, when congestion is detected based on an amount of data accumulated in the buffer corresponding to any one of the QCIs, the backhaul line control unit 13 may determine that the congestion is resolved when the amount of the data accumulated in this buffer falls below a threshold E.

When the backhaul line control unit 13 determines that the congestion has been resolved, the backhaul line control unit 13 notifies the radio resource allocation determination unit 11 of the resolution of the congestion, and notifies the radio resource control unit 12 of a radio resource allocation restriction release.

Figure 2:
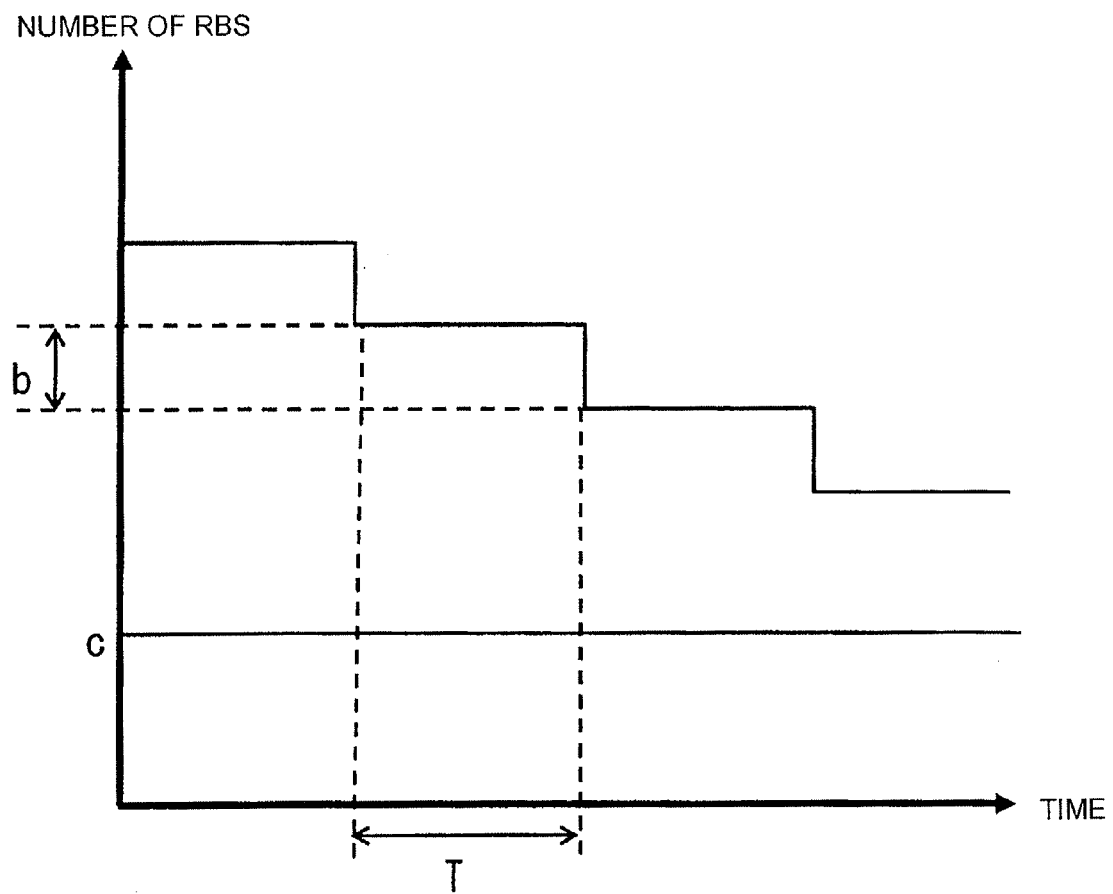
FIG. 2 is a diagram illustrating an allocation of resource blocks according to the first embodiment.

Referring to FIG. 2, a description is now given of the radio resource allocation restriction control according to the first embodiment of this invention. When the radio resource control unit 12 is notified of the radio resource allocation restriction, the radio resource control unit 12 reduces the number of RBs allocated to the mobile communication device 20. The amount of uplink data which the mobile communication device 20 can transmit is reduced by reducing the number of RBs to be allocated. As a result, the data dwelling in the radio base station 10 can be restrained. On this occasion, the radio resource control unit 12 reduces, in a stepwise manner, the number of RBs allocated to the mobile communication devices. The vertical axis of FIG. 2 represents the number of RBs allocated by the radio resource control unit 12 to the mobile communication device, and the horizontal axis represents time. As shown in FIG. 2, the radio resource control unit 12 reduces the number of RBs allocated to the mobile communication device by b each time when a period T elapses. Moreover, a lower limit c is set for the number of RBs allocated to the mobile communication device, and control is provided so that the number of the allocated RBs does not fall below c. On this occasion, the radio resource control unit 12 may reduce the amount of data which the mobile communication device 20 is permitted to transmit, in place of the number of RBs to be allocated. In this case, the vertical axis of FIG. 2 represents the amount of data which the radio resource control unit 12 permits the mobile communication device to transmit, and the horizontal axis represents time.

A rapid decrease in service quality of data communicated between the mobile communication device and the radio base station 10 can be prevented by reducing, in a stepwise manner, the number of RBs allocated to the mobile communication device in this way. Moreover, the mobile communication device can continue the transmission of the uplink data by setting the lower limit.

On this occasion, the radio resource control unit 12 may equally reduce the numbers of RBs allocated to a plurality of mobile communication devices to which the radio resource is allocated. For example, if the number of mobile communication devices to which the radio resource is allocated is N, the radio resource control unit 12 allocates the RBs while b/N of RBs are reduced each time when the period T elapses. As a result, it is possible to prevent the service quality on a certain mobile communication device from decreasing due to a rapid decrease in amount of data transmitted from the certain mobile communication device.

Alternatively, the radio resource control unit 12 may adjust the number of RBs to be reduced based on a QCI set to the data transmitted from each mobile communication device. For example, the radio resource control unit 12 may reduce more the number of RBs allocated to a mobile communication device transmitting data that is low in QCI, and may reduce less the number of RBs allocated to a mobile communication device transmitting data that is high in QCI. As a result, it is possible to restrain to the minimum a decrease in number of RBs for a mobile communication device requiring high service quality, and it is thus possible to restrain to the minimum a decrease in service quality in the mobile communication device transmitting data that is high in QCI.

Referring to FIG. 3, a description is now given of a data table according to the first embodiment of this invention, in which the QCI and the number of bearers which do not satisfy the service quality with each other. The radio resource control unit 12 outputs information on the data table of FIG. 3, in which the number of bearers which do not satisfy the service quality is associated with each of the QCIs, to the radio resource allocation determination unit 11. The priority of QCI1 is the highest, and the priority decreases toward QCI2 and QCI3 in the table of FIG. 3. The number of bearers which do not satisfy the service quality is zero among bearers to which QCI1 to QCI3 are set. Moreover, the number of bearers which do not satisfy the service quality is one among bearers to which QCI4 is set. The numbers of bearers associated with the other QCIs are as shown in FIG. 3.

The radio resource allocation determination unit 11 acquires information shown in FIG. 3 from the radio resource control unit 12. A description is now given of processing in a case where the radio resource allocation determination unit 11 is notified by the backhaul line control unit 13 of a congestion state, and further receives a request to allocate the radio resource.

A description is given of an example in which the threshold A for determining the permission of the allocation of the radio resource is set to "3", and a mobile communication device requests an allocation of the radio resource to data to which QCI5 is set. In this case, the number of bearers which do not satisfy the service quality is "4" for the priorities from QCI1 to QCI5. In this case, the number of bearers which do not satisfy the service quality exceeds the threshold A, and the radio resource allocation determination unit 11 thus rejects the allocation of the radio resource to the mobile communication device which has requested the allocation of the radio resource. On this occasion, when the threshold A is set to "5", the number of bearers which do not satisfy the service quality does not exceed the threshold A, and the radio resource allocation determination unit 11 can thus permit the allocation of the radio resource.

Figure 4:
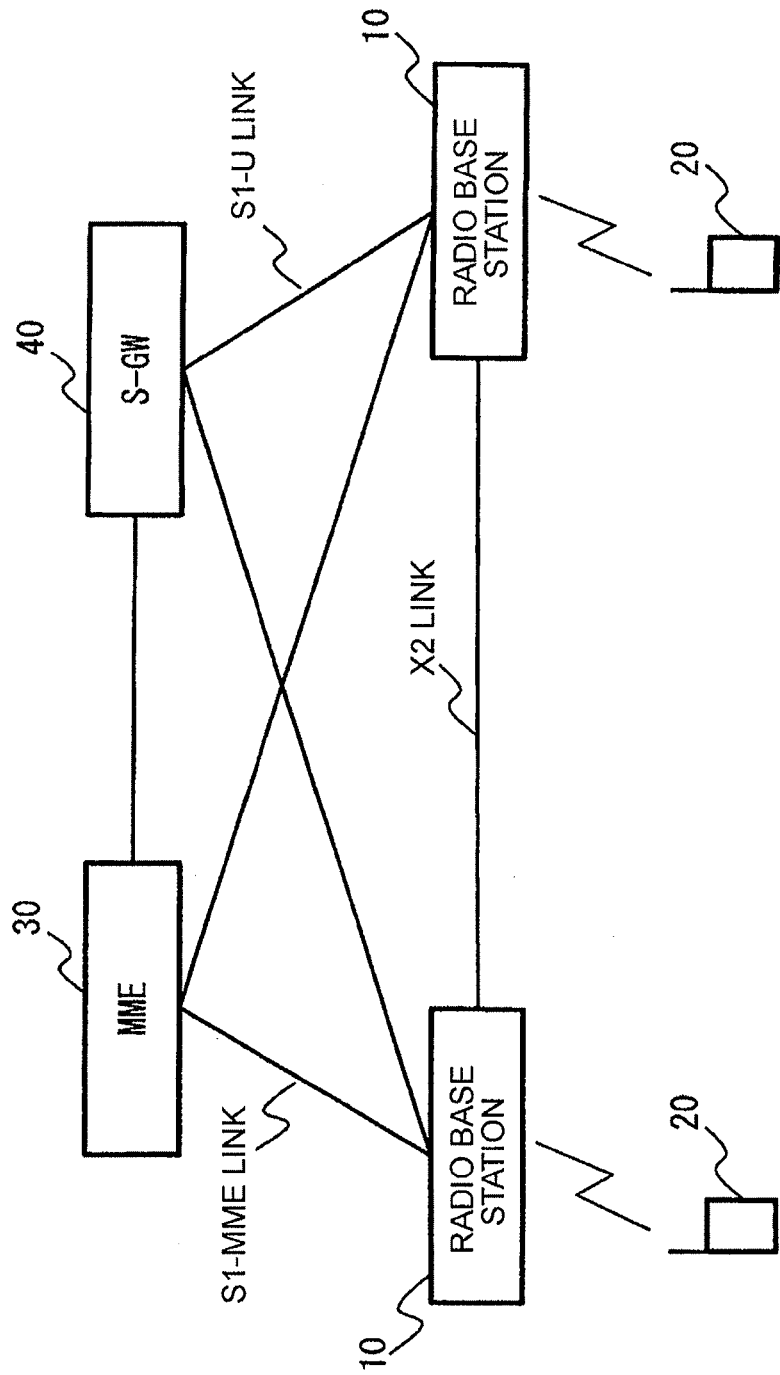
FIG. 4 is a network configuration diagram of an LTE system according to the first embodiment.

Referring to FIG. 4, a description is now given of a configuration example of an LTE network according to the first embodiment of this invention. The LTE network includes the radio base stations 10, an MME 30, and an S-GW 40. The radio base station 10 and the MME 30 are connected with each other via an S1-MME link. The radio base station 10 and the S-GW 40 are connected with each other via an SI-U link. The radio base stations 10 are connected with each other by an X2 link. The SI-MME link, the SI-U link, and the X2 link are respectively referred to as backhaul line. Moreover, a radio section between the base station 10 and the mobile communication device 20 is connected by a UU link.

Figure 5:
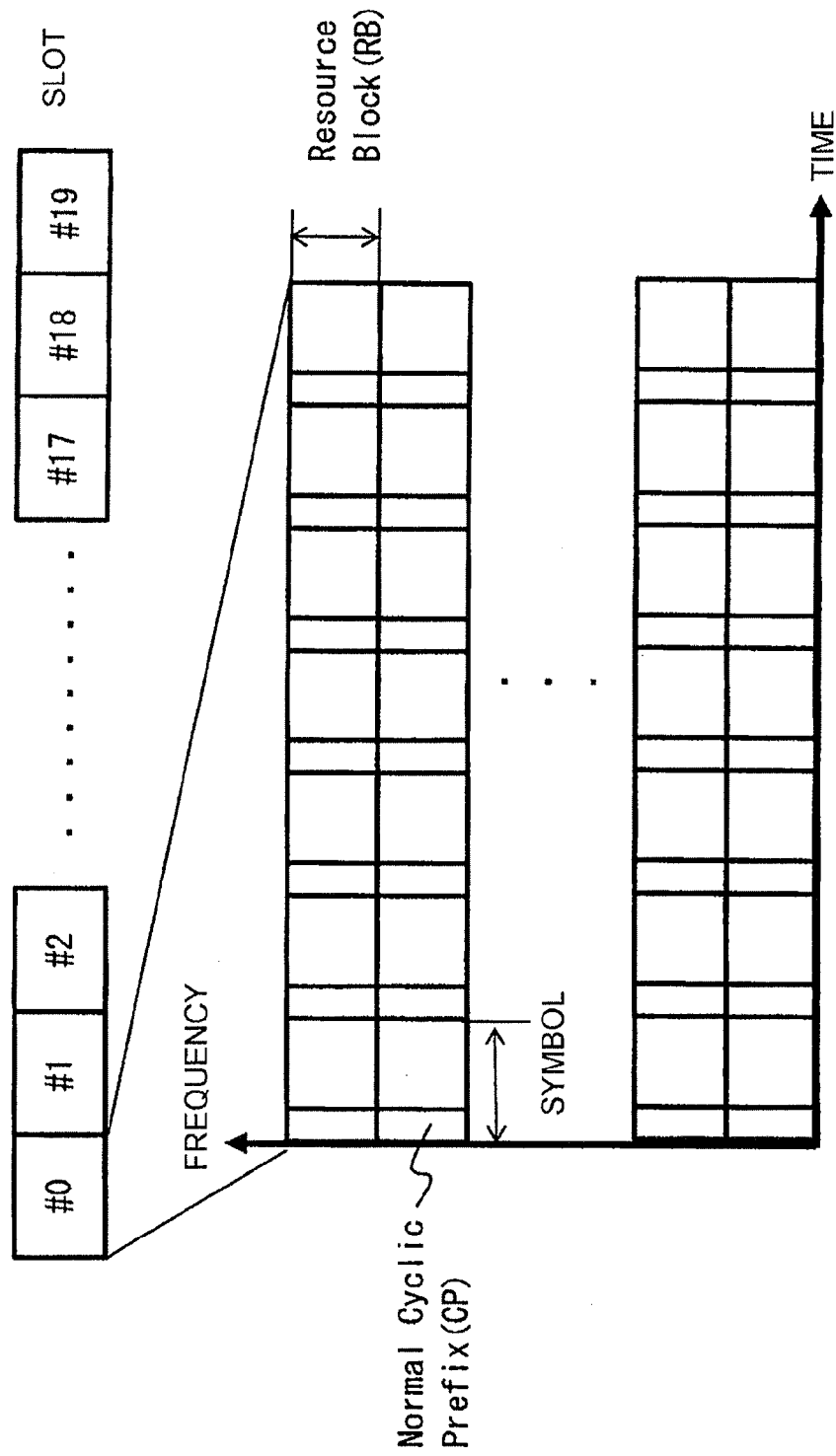
FIG. 5 is a diagram of a frame in the LTE according to the first embodiment.

Referring to FIG. 5, a description is now given of a frame configuration of an LTE-FDD according to the first embodiment of this invention. For the description of the frame configuration, the minimum Time unit is defined as $T\_s=1/(15000\times2048)$ seconds. Further, one radio frame $T\_f$ is defined as $T\_f=307200\times T\_s=10$ milliseconds. Further, a slot $T\_slot$ constituting the radio frame is defined as $T\_slot=15360\times T\_s=0.5$ milliseconds. One radio frame is constituted by 20 slots, one slot is constituted by seven symbols, and a normal cyclic prefix (CP) is added to each symbol. Moreover, subcarriers are arranged at an interval of 15 kHz or 7.5 kHz in the frequency direction. On this occasion, the RB which is a unit of allocating the radio resource to the mobile communication device is an area determined by a time for one slot and by a frequency bandwidth for 12 subcarriers.

Figure 6:
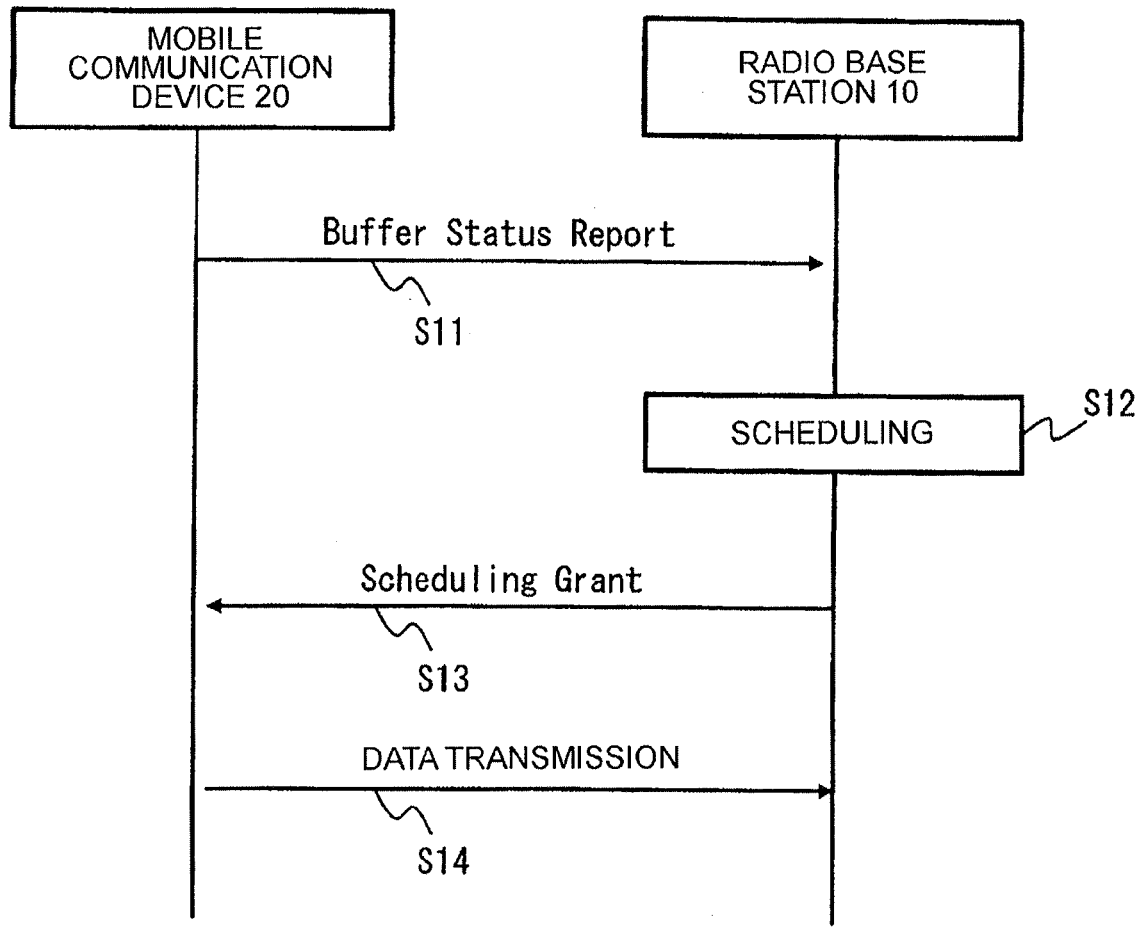
FIG. 6 is a diagram illustrating a sequence relating to the allocation of the resource blocks according to the first embodiment.

Referring to FIG. 6, a description is now given of processing of allocating RBs according to the first embodiment of this invention. The processing illustrated in FIG. 6 assumes a state in which the mobile communication device 20 has requested to allocate the radio resource, and the radio resource allocation determination unit 11 has permitted the allocation of the radio resource. First, the mobile communication device 20 transmits the buffer status report in order to receive an allocation of the radio resource from the radio base station 10 (S11). If the radio resource allocation determination unit 11 permits the allocation of the radio resource in the radio base station 10, the radio resource control unit 12 allocates RBs for transmitting the buffer status report to the mobile communication device 20. Therefore, the mobile communication device 20 can transmit the buffer status report before RBs for uplink data are allocated. The buffer status report notifies of an accumulated state of data in a buffer for transmission of the mobile communication device 20.

Then, the radio resource control unit 12 prepares a schedule based on information of the buffer status report, thereby allocating RBs to the mobile communication device 20 (S12). When a large amount of data is accumulated in the buffer for transmission of the mobile communication device 20, the radio resource control unit 12 allocates a large number of RBs, and when a small amount of data is accumulated, the radio resource control unit 12 reduces RBs to be allocated. Moreover, when the radio resource control unit 12 has received a radio resource allocation restriction notification from the backhaul line control unit 13, the radio resource control unit 12 reduces the number of RBs to be allocated compared with a normal number thereof.

Then, the radio base station 10 uses the scheduling grant to notify the mobile communication device 20 of the determined RBs (S13).

The mobile communication device 20 maps data to the allocated RBs, and transmits the data to the radio base station 10 (S14).

The above-mentioned processing of allocating RBs is similarly carried out for a case where, after congestion occurs on the backhaul line 14, the radio resource allocation determination unit 11 determines allocation of the radio resource to a mobile communication device to which the radio resource is to be newly allocated. Note that, the radio resource to be allocated may be controlled as described below in this case.

After a radio resource allocation restriction is notified, the radio resource control unit 12 may allocate RBs released from an existing mobile communication device to the mobile communication device to which the radio resource is to be newly allocated. As a result, the amount of the radio resource of a mobile communication device to which the radio resource has already been allocated does not fluctuate, and hence a decrease in service quality of the mobile communication device can be prevented.

Alternatively, the radio resource control unit 12 may allocate a part of the radio resource allocated to an existing mobile communication device to the mobile communication device to which the radio resource is to be newly allocated. In other words, the part of the radio resource is a part of the radio resource allocated to the existing mobile communication device after congestion occurs on the backhaul line 14 and the number of allocated RBs is reduced. As a result, an increase in amount of data input to the radio base station 10 can be prevented, and an increase in data dwelling in the radio base station 10 can thus be prevented.

Figure 7:
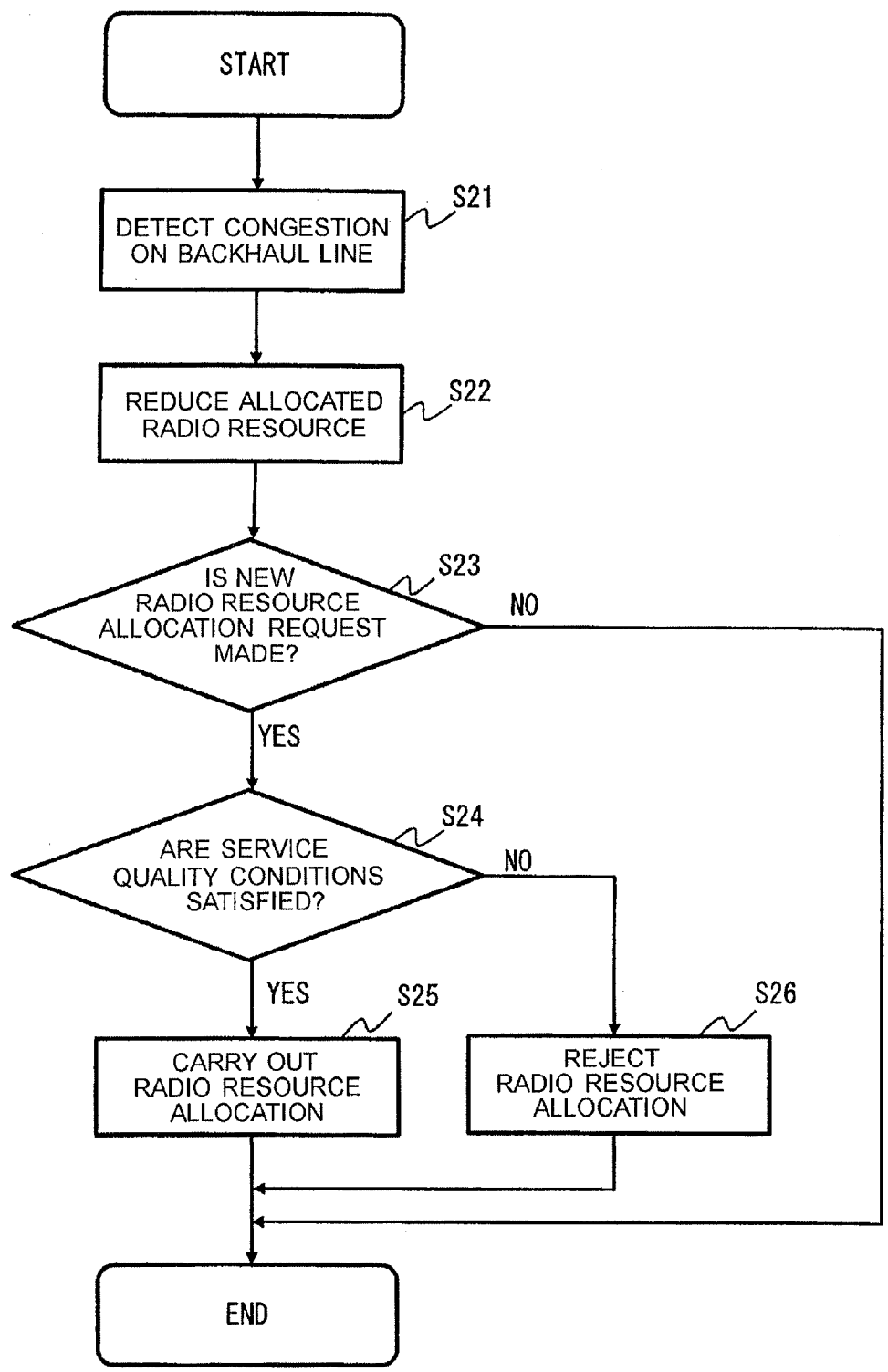
FIG. 7 is a process flowchart of the radio base station according to the first embodiment.

Referring to FIG. 7, a description is now given of a radio resource allocation control method in the radio base station according to the first embodiment of this invention.

First, the backhaul line control unit 13 detects congestion on the backhaul line 14 (S21). Then, the backhaul line control unit 13 outputs a radio resource allocation restriction notification signal to the radio resource control unit 12, and outputs a congestion detection notification signal to the radio resource allocation determination unit 11. The radio resource control unit 12 receives the radio resource allocation restriction notification signal, and reduces an amount of the radio resource allocated to mobile communication devices (S22). Then, the radio resource allocation determination unit 11 receives the congestion detection notification signal, and then determines whether or not a radio resource allocation request is newly made (S23). When a radio resource allocation request is not newly made, the processing ends.

When a radio resource allocation request is newly made, the radio resource allocation determination unit 11 determines whether or not data received from mobile communication devices satisfy service quality conditions (S24). When the radio resource allocation determination unit 11 determines in Step S24 that the service quality conditions are satisfied, the radio resource allocation determination unit 11 determines to carry out the allocation of the radio resource in response to the new radio resource allocation request (S25). When the radio resource allocation determination unit 11 determines in Step S24 that the service quality conditions are not satisfied, the radio resource allocation determination unit 11 determines to reject the allocation of the radio resource in response to the new radio resource allocation request (S26).

As described above, congestion on the backhaul line can be detected by providing the backhaul line control unit in the radio base station according to the embodiment of this invention. Therefore, when congestion on the backhaul line is detected, the radio resource control unit can reduce the amount of the radio resource allocated to transmit uplink data of the mobile communication devices. As a result, data dwelling in the radio base station for transmission can be reduced.

Moreover, if the radio resource allocation determination unit according to the embodiment of this invention is not used, the radio resource control unit reduces the allocated amount of the radio resource, and the radio base station thus determines that a used amount of the radio resource is small. Therefore, the radio base station permits allocation of the radio resource in response to a new radio resource allocation request. As a result, more data to be transmitted dwells in the radio base station. Moreover, when occurrence of congestion on the backhaul line is detected, and the allocation of the radio resource is uniformly rejected, the lost call rate increases even if the service quality of data transmitted from the mobile communication devices is maintained.

The allocation of the radio resource can be determined based on the number of bearers which do not satisfy the service quality for each of the QCIs by using the radio resource allocation determination unit according to the embodiment of this invention. Therefore, an increase in lost call rate can be further restrained without decreasing the service quality of data to which a QCI high in priority is set.

This invention is not limited to the above-mentioned embodiment, and can be properly modified without departing from the gist thereof.

Moreover, though this invention is described as the hardware configuration in the above-mentioned embodiment, this invention is not limited to this configuration. This invention can realize arbitrary processing by controlling the central processing unit (CPU) to execute a computer program. In this case, the computer program may be recorded on a recording medium, and may then be provided, or may be transmitted via the Internet or another communication medium, and may then be provided. Moreover, examples of the recording medium include a flexible disk, a hard disk, a magnetic disk, a magneto-optical disk, a CD-ROM, a DVD, a ROM cartridge, a RAM memory cartridge with battery backup, a flash memory card cartridge, and a non-volatile RAM cartridge. Moreover, examples of the communication medium include a wired communication medium such as a telephone line, and a radio communication medium such as a microwave line.

Though a part or an entirety of the above-mentioned embodiment may be described in the following notes, it is not limited thereto.

(Note 1) A radio base station, including: a radio resource allocation determination unit for determining whether or not to allocate a radio resource to a first mobile communication device; a radio resource control unit for allocating the radio resource to the first mobile communication device to which the radio resource allocation determination unit has determined to carry out the allocation of the radio resource; and a backhaul line control unit for providing control of outputting data received from the first mobile communication device to a backhaul line for relaying the data to a higher-level network, in which, when congestion occurs on the backhaul line: the radio resource control unit reduces an amount of the radio resource to be allocated to the first mobile communication device compared with an amount of the radio resource allocated before the occurrence of the congestion; and the radio resource allocation determination unit determines whether or not to allocate the radio resource to a second mobile communication device to which the radio resource is to be newly allocated after the occurrence of the congestion on the backhaul line, depending on whether or not the data received from the first mobile communication device satisfies a predetermined service quality.

(Note 2) A radio base station as described in Note 1, in which the radio resource allocation determination unit determines whether or not to allocate the radio resource to the second mobile communication device based on at least one of a number of the first mobile communication devices transmitting data which do not satisfy the predetermined service quality and a number of communication lines transmitting data which do not satisfy the predetermined service quality.

(Note 3) A radio base station as described in Note 2, in which the radio resource allocation determination unit allocates the radio resource to the second mobile communication device when the at least one of the number of the first mobile communication devices transmitting data which do not satisfy the predetermined service quality and the number of communication lines transmitting data which do not satisfy the predetermined service quality is less than a predetermined number.

(Note 4) A radio base station as described in any one of Notes 1 to 3, in which: the predetermined service quality is set for each of a plurality of the first mobile communication devices; and the radio resource control unit reduces an amount of the radio resource allocated to the first mobile communication device to which service quality lower than the predetermined service quality is set.

(Note 5) A radio base station as described in any one of Notes 1 to 3, in which the radio resource control unit reduces an amount of the radio resource allocated to each of the first mobile communication devices to which the radio resource is allocated based on service quality set to the each of the first mobile communication devices.

(Note 6) A radio base station as described in any one of Notes 1 to 5, in which the radio resource control unit allocates, to the second mobile communication device to which the radio resource allocation determination unit has determined to allocate the radio resource, after the congestion occurs on the backhaul line, the amount of the radio resource reduced from the first mobile communication device.

(Note 7) A radio base station as described in any one of Notes 1 to 5, in which the radio resource control unit allocates, to the second mobile communication device, after the congestion occurs on the backhaul line, a part of the radio resource allocated to the first mobile communication device.

(Note 8) A radio base station as described in any one of Notes 1 to 7, in which the radio resource control unit measures service quality of the data received from a plurality of the first mobile communication devices, and outputs a result of the measurement to the radio resource allocation determination unit.

(Note 9) A radio base station as described in Note 8, in which the radio resource control unit measures at least one of a bit rate and a delay of the data.

(Note 10) A radio base station as described in any one of Notes 1 to 9, in which the radio resource control unit reduces, in a stepwise manner, the amount of the radio resource to be allocated.

(Note 11) A radio base station as described in Note 10, in which the radio resource control unit reduces the amount of the radio resource so that the allocated amount of the radio resource does not fall below a predetermined value.

(Note 12) A control processor for determining, when congestion occurs on a backhaul line, to which a base station outputs data transmitted from a mobile communication device to the base station for relaying the data to a higher-level network, whether or not to allocate a radio resource to another mobile communication device to which the radio resource is to be newly allocated after the occurrence of the congestion on the backhaul line, depending on whether or not the data received by the radio base station satisfies predetermined service quality.

(Note 13) A program for causing a computer to execute a step of determining, when congestion occurs on a backhaul line, to which a base station outputs data transmitted from a mobile communication device to the base station for relaying the data to a higher-level network, whether or not to allocate a radio resource to another mobile communication device to which the radio resource is to be newly allocated after the occurrence of the congestion on the backhaul line, depending on whether or not the data received by the radio base station satisfies predetermined service quality.

(Note 14) A radio resource allocation control method, including the steps of: detecting congestion on a backhaul line when data transmitted from a mobile communication device is output to the backhaul line for relaying the data to a higher-level network; reducing an amount of a radio resource to be allocated to the mobile communication device when the congestion occurs on the backhaul line; and determining whether or not to allocate the radio resource to another mobile communication device to which the radio resource is to be newly allocated after the congestion occurs on the backhaul line, depending on whether or not the data transmitted from the mobile communication device satisfies predetermined service quality.

This application claims priority from Japanese Patent Application No. 2010-025447, filed on Feb. 8, 2010, the entire disclosure of which is incorporated herein by reference.

The invention claimed is:

1. A radio base station, comprising:
a radio resource allocation determination processor configured for determining whether or not to allocate a radio resource to a first mobile communication device;
a radio resource control processor configured for allocating the radio resource to the first mobile communication device to which the radio resource allocation determination processor has determined to carry out the allocation of the radio resource; and
a backhaul line control processor configured for providing control of outputting data received from the first mobile communication device to a backhaul line for relaying the data to a higher-level network, wherein, when congestion occurs on the backhaul line:
the radio resource control processor allocates an amount of the radio resource to be allocated to the first mobile communication device lower than an amount of the radio resource allocated before the occurrence of the congestion, while maintaining a connection between the first mobile communication device and the radio base station; and
the radio resource allocation determination processor determines whether or not to allocate the radio resource to a second mobile communication device, which is different from the first mobile communication device and to which the radio resource is to be newly allocated after the occurrence of the congestion on the backhaul line, depending on whether or not the data received from the first mobile communication device satisfies a predetermined service quality.

2. A radio base station according to claim 1, wherein the radio resource allocation determination processor determines whether or not to allocate the radio resource to the second mobile communication device based on at least one of a number of the first mobile communication devices transmitting data which do not satisfy the predetermined service quality and a number of communication lines transmitting data which do not satisfy the predetermined service quality.

3. A radio base station according to claim 2, wherein the radio resource allocation determination processor allocates the radio resource to the second mobile communication device when the at least one of the number of the first mobile communication devices transmitting data which do not satisfy the predetermined service quality and the number of communication lines transmitting data which do not satisfy the predetermined service quality is less than a predetermined number.

4. A radio base station according to claim 1, wherein:
the predetermined service quality is set for each of a plurality of the first mobile communication devices; and
the radio resource control processor reduces an amount of the radio resource allocated to the first mobile communication device to which service quality lower than the predetermined service quality is set.

5. A radio base station according to claim 1, wherein the radio resource control processor reduces an amount of the radio resource allocated to each of the first mobile communication devices to which the radio resource is allocated based on service quality set to the each of the first mobile communication devices.

6. A radio base station according to claim 1, wherein the radio resource control processor allocates, after the congestion occurs on the backhaul line, to the second mobile communication device to which the radio resource allocation determination means has determined to allocate the radio resource, the amount of the radio resource reduced from the first mobile communication device.

7. A radio base station according to claim 1, wherein the radio resource control processor allocates, after the congestion occurs on the backhaul line, to the second mobile communication device, a part of the radio resource allocated to the first mobile communication device.

8. A radio base station according to claim 1, wherein the radio resource control processor measures service quality of the data received from a plurality of the first mobile communication devices, and outputs a result of the measurement to the radio resource allocation determination processor.

9. A radio base station according to claim 8, wherein the radio resource control processor measures at least one of a bit rate and a delay of the data.

10. A radio base station according to claim 1, wherein the radio resource control processor reduces, in a stepwise manner, the amount of the radio resource to be allocated.

11. A radio base station according to claim 10, wherein the radio resource control processor reduces the amount of the radio resource so that the allocated amount of the radio resource does not fall below a predetermined value.

12. A base station, comprising:
a control processor and a memory configured to:
determine, when congestion occurs on a backhaul line, to which a base station outputs data transmitted from a first mobile communication device to the base station for relaying the data to a higher-level network, whether or not to allocate a radio resource to a second mobile communication device, which is different from the first mobile communication device and to which the radio resource is to be newly allocated after the occurrence of the congestion on the backhaul line, depending on whether or not the data received by the radio base station satisfies predetermined service quality;
allocate the radio resource to the second mobile communication device; and
when congestion occurs on a backhaul line, used for relaying data received from the second mobile communication device to a higher-level network, allocating an amount of the radio resource to be allocated to the second mobile communication device lower than an amount of the radio resource allocated before the occurrence of the congestion, while maintaining a connection between the first mobile communication device and the radio base station.

13. A radio resource allocation control method, comprising:
detecting congestion on a backhaul line when data transmitted from a first mobile communication device is output to the backhaul line for relaying the data to a higher-level network;
allocating an amount of a radio resource to be allocated to the first mobile communication device when the congestion occurs on the backhaul line, such that the amount of the radio resource allocated to the first mobile communication device is lower than an amount of the radio resource allocated to the first mobile communication device before the occurrence of the congestion, while maintaining a connection between the first mobile communication device and the radio base station; and determining whether or not to allocate the radio resource to a second mobile communication device, which is different from the first mobile communication device and to which the radio resource is to be newly allocated after the congestion occurs on the backhaul line, depending on whether or not the data transmitted from the first mobile communication device satisfies predetermined service quality.

\* \* \* \* \*